United States Patent Office 3,447,883
Patented June 3, 1969

3,447,883
NOVEL METHOD OF BLENDING OLEFIN
POLYMERS AND ADDITIVES
Jackson S. Boyer, Claymont, Del., and Francois E. Didot,
West Chester, Pa., assignors to Avisun Corporation, a
corporation of Delaware
No Drawing. Filed May 6, 1965, Ser. No. 453,813
Int. Cl. D06p 3/00, 5/00
U.S. Cl. 8—4                                    10 Claims

ABSTRACT OF THE DISCLOSURE

Petroleum wax is incorporated into preformed polyolefin articles by soaking the articles in molten petroleum wax at a temperature below the fusion point of the polyolefin for a period of at least two minutes, and then removing unabsorbed wax.

---

This invention relates to an improved method for producing blends of high molecular weight polymeric hydrocarbons and hydrocarbon wax.

Specifically this invention relates to a method of incorporating hydrocarbon wax and hydrocarbon wax and hydrocarbon soluble additives into crystalline polyolefin polymer.

It is known that polymers can be prepared by polymerizing unsaturated aliphatic hydrocarbons such as ethylene and its homologs at controlled temperatures and pressures in the presence of certain polymerization catalysts. The polymerization reaction can be carried out in the presence of an organic reaction medium and in some instances the liquefied unsaturated olefinic hydrocarbon forms the medium for the reaction. It is also known that the incorporation of hydrocarbon waxes into the polymeric hydrocarbons imparts improved properties to the hydrocarbon polymer and results in a blend having desirable properties. Plastic homogeneous mixtures or blends of hydrocarbon wax with polymeric hydrocarbons have been recommended for many commercial uses. Among these many important uses are included uses as various kinds of molded articles, waterproof coating compositions, gasproof and waterproof sheets and envelopes as well as wrapping cartons. Paraffinic waxes have been particularly useful in extending solid polyolefins. These uses represent only a limited enumeration of the large number of uses to which blends of polymeric hydrocarbons and hydrocarbon waxes have been put.

One of the problems that has been encountered in the formation of blends of hydrocarbon wax and polymeric hydrocarbons involves the procedure employed for forming the mixture. U.S. Patent 2,504,270 suggests that wax and polymeric hydrocarbons can be homogeneously mixed in equipment such as extruders or other types of mixing apparatus. However, it has been found that when such apparatus is employed in the mixing operation the waxes tend to make the surface of the extruder or other mixing apparatus so slippery that uneven extrusion and in some instances no mixing at all is realized. U.S. Patent 2,706,719 suggests a solution for this mixing problem which involves the incorporation of the wax into the reaction mixture during polymerization of the unsaturated hydrocarbon in which case the wax is present in the reactor throughout the polymerization. This procedure may result in rather homogeneous blends of the wax and polymeric hydrocarbon but the wax tends to increase the viscosity of the polymerization reaction medium and thus to increase the difficulties in carrying out the polymerization reaction. Also the wax must be handled throughout the polymerization reaction and it thus tends to increase the overall costs of producing the polymer. Another suggested solution to the mixing problem involves the mixing of the polymeric hydrocarbon and wax while incorporating a metallic halide, such as aluminum chloride, into the blend during agitation. The presence of the metallic halide, of course, adds to the cost of the blend and it is also an impurity whose presence can in some instances be quite undesirable. All of the deficiencies of the presently known processes of making homogeneous blends of wax and polymeric hydrocarbons can now be overcome by the process of the present invention.

It is an object of this invention to provide a novel and improved process for incorporating hydrocarbon wax alone or hydrocarbon wax and organic hydrocarbon soluble additives into crystalline solid polyolefins.

It is another object of this invention to provide a novel and improved procedure for incorporating hydrocarbon wax or wax and hydrocarbon soluble additives into crystalline solid polyolefins without subjecting the polyolefins to shear and thermal degradation caused by mechanical blending and extrusions, and without physically altering the form of the fused polyolefin polymer.

In accordance with this invention it has been discovered that the difficulties encountered in the presently used methods of incorporating hydrocarbon wax and hydrocarbon soluble additives into crystalline solid high molecular weight polymeric hydrocarbons, particularly polyethylene, can be overcome. In the present invention hydrocarbon wax is incorporated into a crystalline solid polyolefin by immersing the solid polymer in the molten hydrocarbon wax at a temperature below the fusion point of the polymer and above the melting point of the wax for a time period whereby the desired amount of hydrocarbon wax is absorbed by the solid polymer thereby resulting in a blend of the solid polymer and hydrocarbon wax. When a hydrocarbon soluble additive is also to be incorporated in the polyolefin, the additive is first dissolved in the molten wax and the same procedure is then used. Normally the polymeric article requires at least 2 minutes of immersion time in the molten wax solution to absorb any substantial amount of wax.

This invention is particularly applicable to extruded or injection molded crystalline polymer articles which can be in the form of films, fibers, molded articles, or in the form of solid pellets which usually range from about 0.1 to 1.0 cm. in diameter. The term crystalline solid polyolefin as used herein is meant to describe an olefin polymer which has been melted and subsequently cooled and solidified.

There are many commercial processes for making formed articles, films, continuous filaments, and solid pellets from polyolefin powders which methods are well known to those skilled in the art. The present invention is a process of incorporating hydrocarbon wax and hydrocarbon-soluble polymer additives into crystalline solid polyolefin polymer without physically altering the polymer form. As a consequence of this method of addition of polymer additives, it is possible to produce a blend of the additives and the polymeric hydrocarbon that is ready to market without further processing.

The olefinically unsaturated aliphatic hydrocarbons that are employed to produce the solid polymers for use in this process ordinarily contain from 2 to 10 carbon atoms. Ethylene and propylene and copolymers thereof are the preferred olefinic hydrocarbons but it is possible to produce solid polymeric materials from other olefinic hydrocarbons such as isobutylene, n-butylene, the pentenes, the hexenes, and the like. Ordinarily the olefinic hydrocarbons are of the monoolefinic type containing the unsaturated bond in the α-position.

There are many well known methods of producing polyolefins usable for the purposes of the present invention. Some of these methods are disclosed in U.S. Patents 2,153,533; 2,188,465; 2,827,446; 2,996,491; 3,055,878; 3,061,601; 3,099,647; Belgian Patents 533,362; 534,792, 534,888; and others.

In general the wax that is employed to form the polymeric hydrocarbon-wax blend of this invention has a melting point in the range of about 90° F. to 230° F. This type of wax includes substances such as crystalline paraffin wax, the amorphous paraffinic waxes, for example, petroleum waxes, high melting point waxes, carnauba wax and various other waxes of synthetic, mineral, vegetable, and animal origin, for example, montan wax, beeswax, candelilla wax and the like. For the practice of this invention it is preferred to use a petroleum wax or a synthetic wax prepared by the reaction of hydrogen and carbon monoxide in the so-called Fischer-Tropsche process. Such waxes can have a melting point within the range of 90°–220° F. and higher and these waxes have been found to be quite suitable for blending with polymeric hydrocarbons.

Petroleum waxes are obtained by well known dewaxing procedures from waxy lubricating oils such as by solvent dewaxing with a methyl ethyl ketone-toluene mixture, methyl isobutyl ketones, propane, and the like. The precipitated wax crystals are removed by centrifuging or filtering to form a slack wax, and then are preferably further purified to form scale wax and refined wax. Preferably refined waxes contain less than 0.5% by weight of contaminating oil. The refined crystalline petroleum waxes used in the present invention are well known articles of commerce.

When it is desired to incorporate a dye also in the polyolefin, any hydrocarbon-soluble organic dye is usable for the purposes of the present invention. Many of these dyes are coal tar derivatives. Sources of the hydrocarbon-soluble organic dyes and methods of synthesis are disclosed in vol. 2, pages 258–260, and vol. 5, pages 327–353, of Encyclopedia of Chemical Technology, edited by Kirk and Othmer, Interscience Publishers, New York, N.Y., 1950. Examples of some of the hydrocarbon-soluble dyes usable in the present invention include the methyl derivatives of azobenzene 4 - azo - 2 - naphthol, phenylazo - 2 - naphthol, para-diethylaminoazobenzene, 1,4 - di(isopropylamino)anthroquinone, Oil Red OS, and others.

Polyolefin polymers which can be recovered by practice of the methods of polymerization disclosed by the above cited patent references are normally recovered as fine white granular powders. These powders are difficult to handle and are usually further processed by being blended with additives such as thermal stabilizers. The blend is then melt extruded, quenched, and cut into small pellets which are easily packaged for commercial distribution. If after the polymer is in the pellet form it is decided to blend the polymer with wax, the polymer pellets and wax are normally mechanically mixed, then extruded through a melt extruder and again pelletized. It is often necessary to extrude the wax-polymer blend three or four times in order to achieve any level of homogenity throughout the blend. It is well known that solid polyolefins are extremely susceptible to shear and thermal degradation. Continous heating and mechanical working (which occur during repeated melt extrusions) of crystalline polyolefins results in a degraded polymer which is commercially unattractive and which polymer must sometimes be discarded as scrap. We have now discovered a process by which a blend of wax and crystalline polyolefin pellets can be made without subjecting the polyolefin pellets to the detrimental effects of hot melt extrusion.

We have also discovered that blends of wax and crystalline polyolefin pellets having a predetermined wax concentration can be recovered by immersing the polyolefin pellets in the molten wax to be blended therewith for a time sufficient to achieve the desired concentration in the polymer pellets. The pellets are then recovered from the excess or nonabsorbed molten wax and cooled to room temperature. A dry free-flowing polymer pellet having the desired amount of wax incorporated therein is recovered.

The process of the present invention is economically very attractive in that no complex equipment is required, the processing time is relatively short, and there is little or no loss of polymer or wax in the process.

Another advantage of the present invention is that it provides a new and unique method of coloring solid polyolefins. Heretofore polyolefins have been colored by dispersing color-imparting pigments into the polymer powder or by mixing with the polymer pellets. The mix is then mechanically worked at elevated temperature for substantial time periods to accomplish a homogeneous blend of the polymer and pigment. The colored polymer is then further processed by procedures such as film extrusion or injection molding to form the polymer into its final commercial product. Equipment used in processing pigmented polymer must be thoroughly purged of the first type of polymer when it is desired to make a color change.

This purging process is undesirable in that it is expensive and time and material consuming. By the process of the present invention these processing difficulties can be easily overcome. By the process of the present invention the formed articles are made with natural uncolored polymer and are subsequently colored after they have been formed. The formed article is immersed in molten wax containing the desired concentration of wax-soluble dye for a period of time wherein a sufficient amount of wax and dye are absorbed to impart to the preformed polymer article the desired color. The intensity and depth of color in the preformed polymer articles are directly related to the dye concentration in the wax used and also the final ratio of wax to polymer in the blend. The amount of wax that can be absorbed into the preformed polymeric article is related to the surface area to volume ratio of the formed article as well as the type of polymer used, the length of time the article is immersed in the molten wax, and the temperature of the molten wax. For example a 10 ml thick film of low density crystalline polyethylene film requires much less time to absorb a given amount of paraffin wax at 180° F. than an injection molded bottle of the same polymer. Also an injection molded bottle of crystalline polyethylene takes less time to absorb a given amount of wax at 180° F. than an injection molded bottle of the same dimensions formed from crystalline polypropylene. The time of immersing the preformed polymeric article in the molten wax can be reduced substantially by preheating the polymer article before the immersion step. Normally the finished article of the wax-polymer blend contains considerably less wax than polymer.

Excess unadsorbed wax often remains on the surface of the formed polymeric article. This wax can be removed by washing the article with a suitable wax solvent or by placing the treated article in an oven at a temperature which is above the melting point of the wax and below the fusion point of the article. The amount of time necessary for the major portion of the excess wax to drain from the surface of the treated polymeric articles varies according to the temperature of the oven and the melting point of the wax and is normally between 1 to 10 hours.

The concentration of organic dye in the petroleum wax can be in the range of 0.001 to 10 weight percent with 0.01 to 1.0 weight percent being the preferred range. The organic dye can be easily homogeneously mixed into the molten wax by well known methods of mixing.

The preformed articles that are blended with hydrocarbon wax or hydrocarbon wax and organic dye solutions according to the methods of the present invention can be formed from compositions containing 10 to 100 weight percent of the polyolefin polymer. Other components of the compositions can include fillers such as asbestos, clay, carbon black, and wood flour, and also other thermoplastic polymers which are compatible with polyolefins. These fillers are standard articles of commerce which are available to the general public and need no further description.

In the practice of this invention it is desirable that the formed article to be blended with wax by the process of the present invention contain at least 10 weight percent polyolefin polymer in the composition. This minimum concentration permits a sufficient quantity of wax or wax and dye to be absorbed into the composition so that the desired result to the finished product is achieved.

The following examples illustrate specific embodiments of the process of the present invention.

EXAMPLE I

Fifty grams of low density high molecular weight crystalline polyethylene in the form of solid pellets having a density of 0.916 (ASTM D1505–60T) and a melt index of 20 (ASTM D1238–62T) were immersed for 30 minutes in a liter (770 gm.) of molten paraffin petroleum wax (melting point 126° F.) at a temperature of 180° F. The polyethylene pellets were then separated from the petroleum wax and drained of the remaining unabsorbed wax, and cooled to room temperature with agitation. Polyethylene pellets which were free-flowing and outwardly physically unchanged were recovered and found to contain 30% by weight of absorbed paraffin wax.

EXAMPLE II

Fifty grams of high molecular weight crystalline polypropylene in the form of solid pellets were immersed for 30 minutes in a liter (770 gm.) of molten petroleum paraffin wax (melting point 126° F.) at a temperature of 180° F. The polyproylene pellets were then withdrawn from the wax, drained of the unabsorbed surface paraffin wax, and cooled to room temperature with agitation. Polypropylene pellets which were free-flowing and outwardly physically unchanged were recovered. Upon analysis the pellets were found to contain 25 weight percent of absorbed paraffin wax.

EXAMPLE III

To a liter (770 gm.) of molten paraffin petroleum wax as described in Example I was added 0.3 gram of Oil Red OS dye, which immediately dissolved in the molten wax and gave the wax a uniform deep red color. Fifty grams of polyethylene pellets as described in Example I were processed according to the procedures described in Example I. Free-flowing polyethylene pellets having a medium red appearance were recovered. The pellets were otherwise physically unchanged and were found to contain 30 percent by weight of paraffin wax.

EXAMPLE IV

An eight ounce capacity blow molded polyethylene squeeze bottle which is a standard article of commerce was partially immersed in the wax-dye solution described in Example III for 15 minutes at 180° F. The bottle was withdrawn and the nonabsorbed wax dye solution was wiped from the bottle surface and the bottle was cooled to room temperature. The part of the bottle that was contacted with the wax-dye solution was uniformly colored a medium red color. The wax-contacted part of the bottle was found to contain 12 weight percent of the paraffin wax. The physical appearance of the bottle was otherwise unaltered. Examination revealed that the dye coloring had penetrated the entire wall of the bottle and not merely the surface.

Any additive which is at least partially hydrocarbon-soluble can be incorporated into preformed solid crystalline polyolefin articles by the process of the present invention. Hydrocarbon soluble additives such as dyes, thermal and ultraviolet stabilizers such as 2,6-ditertiarybutyl-4-methylphenol, dilaurylthiodipropionate, tricresylphosphate and also those disclosed in U.S. Patent 2,985,617 which have the required solubility characteristics are usable in the present invention.

Another variation of the method of incorporating hydrocarbon-soluble additives into preformed solid crystalline polyolefin articles comprises coating the preformed article with a molten solution of hydrocarbon wax and the desired additive, and chilling the coated article to maintain the wax solution coated thereon. The coating step can be accomplished by diping the formed article in a molten solution of the wax and additive; spraying the article with a molten solution of the wax and additive, or by any of the many well known methods of coating formed articles. The coated article is then placed in an oven or other equipment similar thereto with adequate temperature control facilities, which oven is maintained at a temperature above the melting point of the wax-additive solution and below the fusion point of the polymer article for a period of time whereby the surface coating on the formed article is at least partially absorbed. The time necessary to accomplish the absorption of the coating into the formed article will vary according to the thickness of the coating, and the temperature at which the coated article is treated during the absorption step. In general a least 10 minutes and not longer than 1000 minutes are required.

One of the unique advantages offered by this last-described method of incorporating additives into preformed solid polyolefins is the manner in which a dye can be incorporated into the formed article. When the wax-dye coated polyolefin article is subject to the absorption step in the oven as described above, the coating upon melting will slowly flow down the surface of the preformed article from the top to the base so that the amount of wax-dye solution absorbed by the formed article will vary accordingly. Thus by this procedure a preformed article which contains variations in color intensities over the surface of the article is recovered. This type of article is particularly desirable for use in interior decorations. Also, multicolored articles as well as articles having various blends and fusions of colors incorporated into the article may be recovered by this process of the present invention.

The red hydrocarbon soluble dye which is designated as Oil Red, and which has been used in the present invention is a standard article of commerce. The composition and synthesis of this dye is described in vol. 2, page 259, Kirk and Othmer, cited supra.

Wax content of the polyolefin polymer-wax blends given in the above examples were determined by extracting the wax-polymer blend with ten times its volume of methyl ethyl ketone at a temperature slightly below the boiling point of the solvent for a time period of 2 hours. Only the hydrocarbon wax is normally soluble in the ketone solvent.

We claim:

1. A method of preparing a blend of a solid crystalline preformed article comprising at least 10 percent by weight of an olefin polymer and hydrocarbon wax which comprises immersing said crystalline polyolefin article in molten hydrocarbon wax, said wax being at a temperature above its melting point and below the fusion of the crystalline polyolefin, said immersion being for a time in excess of 2 minutes sufficient to allow substantial absorption of wax into the crystalline polyolefin and subsequently separating nonabsorbed wax from the polyolefin article.

2. A method according to claim 1 wherein the crystalline polyolefin is polyethylene.

3. A method according to claim 1 wherein the crystalline polyolefin is polyproplene.

4. A method according to claim 1 wherein the crystalline polyolefin is propylene-ethylene copolymer.

5. A method according to claim 1 wherein the hydrocarbon wax contains a hydrocarbon soluble organic dye in the concentration range of 0.01 to 10.0 weight percent based on the weight of the petroleum wax.

6. A method according to claim 1 wherein the hydrocarbon wax is a petroleum wax.

7. A method of dyeing an article comprised of crystalline polyolefin which comprises immersing said article in molten hydrocarbon wax having 0.01 to 10.0 weight percent hydrocarbon soluble organic dye dissolved therein, the molten wax-dye solution being at a temperature above the melting point of the wax and below the fusion point of the polymer, soaking the immersed polyolefin article in the wax-dye solution for a time in excess of 2 minutes sufficient to allow substantial absorption of the wax-dye solution into the fused polyolefin article and subsequently separating the unabsorbed wax-dye solution from the polyolefin article.

8. A method according to claim 7 wherein the polyolefin polymer is selected from the group consisting of polyethylene, polypropylene, and propylene-ethylene copolymer.

9. A method of incorporating hydrocarbon-soluble additives into a preformed article comprising at least 10 percent by weight of an olefin polymer which comprises immersing said article in molten hydrocarbon wax having the hydrocarbon-soluble additive dissolved therein, the molten wax-additive solution being at a temperature above the melting point of the wax and below the fusion point of the polymer, soaking the immersed polyolefin article in the wax-additive solution for a time in excess of 2 minutes sufficient to allow substantial absorption of the wax-additive solution into the solid polyolefin article and subsequently separating the unabsorbed wax solution from the polyolefin article.

10. A method of incorporating a hydrocarbon-soluble additive into an article comprised of at least 10 percent by weight of solid crystalline polyolefin polymer which comprises coating the polyolefin article with a molten solution of the hydrocarbon-soluble additive and hydrocarbon wax, permitting the wax-additive solution to solidify on the surface of the fused polyolefin article, and subsequently subjecting the wax-additive coated polyolefin article to a temperature above the melting point of the wax and below the fusion point of the polymer for a time necessary to permit substantial absorption of the wax-additive coating by the preformed solid polymer article.

References Cited

UNITED STATES PATENTS

| | | | |
|---|---|---|---|
| 3,052,569 | 9/1962 | McNamara | 117—168 X |
| 3,068,516 | 12/1962 | Hofer | 117—168 X |
| 3,157,457 | 11/1964 | Lutgerhorst | 8—4 |
| 3,284,228 | 11/1966 | Ekstrom et al. | 117—138.8 X |

FOREIGN PATENTS

| | | |
|---|---|---|
| 809,495 | 2/1959 | Great Britain. |
| 1,039,626 | 10/1962 | France. |

WILLIAM D. MARTIN, *Primary Examiner.*

J. E. MILLER, *Assistant Examiner.*

U.S. Cl. X.R.

117—33.3, 94, 100, 102, 113, 138.8, 168

PO-1050
(5/69)

UNITED STATES PATENT OFFICE
CERTIFICATE OF CORRECTION

Patent No. 3,447,883    Dated June 3, 1969

Inventor(s) Jackson S. Boyer and Francois E. Didot

It is certified that error appears in the above-identified patent and that said Letters Patent are hereby corrected as shown below:

Column 3, line 2, "2,153,533" should be --2,153,553--; line 16, "Tropsche" should be --Tropsch--. Column 4, line 13, "temperature" should be --temperatures--; line 33, "articles" should be --article--; line 41, "ml" should be --mil--; line 61, "articles" should be --article--. Column 6, line 10, "diping" should be --dipping--; line 61, after "fusion" insert --point--. Column 7, line 4, after "polyolefin" insert --polymer--.

SIGNED AND
SEALED

JUN 16 1970

(SEAL)
Attest:

Edward M. Fletcher, Jr.
Attesting Officer

WILLIAM E. SCHUYLER, JR.
Commissioner of Patents